US011738597B2

(12) United States Patent
McKay et al.

(10) Patent No.: US 11,738,597 B2
(45) Date of Patent: *Aug. 29, 2023

(54) RETRACTABLE WHEEL ASSEMBLY FOR RAISING AND LOWERING A GAMING MACHINE CABINET

(71) Applicant: Aristocrat Technologies Australia Pty Limited, North Ryde (AU)

(72) Inventors: Linn Anthony McKay, Henderson, NV (US); Dominic S. Biondo, Las Vegas, NV (US); James Joseph McNierney, Las Vegas, NV (US); Donald Wayne Bauer, Henderson, NV (US); Timothy Francis Barbour, Nolensville, TN (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,876

(22) Filed: Apr. 11, 2022

(65) Prior Publication Data

US 2022/0234386 A1 Jul. 28, 2022

Related U.S. Application Data

(63) Continuation of application No. 17/004,799, filed on Aug. 27, 2020, now Pat. No. 11,298,978, which is a
(Continued)

(51) Int. Cl.
*B60B 33/06* (2006.01)
*G07F 17/32* (2006.01)
*G07F 17/34* (2006.01)

(52) U.S. Cl.
CPC ........ *B60B 33/066* (2013.01); *G07F 17/3218* (2013.01); *G07F 17/3209* (2013.01);
(Continued)

(58) Field of Classification Search
CPC ... B60B 33/066; G07F 17/3218; G07F 17/34; G07F 17/329; G07F 17/3211; G07F 17/3209; G07F 17/3293
See application file for complete search history.

(56) References Cited

U.S. PATENT DOCUMENTS 2,803,510 A 8/1957 Carbary
2,841,410 A 7/1958 Kessler, Jr.
(Continued)

OTHER PUBLICATIONS

Notice of Allowance dated May 20, 2020 for U.S. Appl. No. 16/010,023 (pp. 1-5).
(Continued)

*Primary Examiner* — Seng H Lim
(74) *Attorney, Agent, or Firm* — Armstrong Teasdale LLP

(57) ABSTRACT

An electronic gaming machine includes a cabinet and a pair of retractable wheel assemblies mechanically coupled to the cabinet. Each retractable wheel assembly includes a first retractable wheel and a second retractable wheel. The first retractable wheel and the second retractable wheel of each retractable wheel assembly are movable, independently of one another, between a retracted position, in which the pair of retractable wheel assemblies allow the cabinet to contact an external surface, and an extended position, in which the pair of retractable wheel assemblies support the cabinet above the external surface.

20 Claims, 8 Drawing Sheets

Related U.S. Application Data continuation of application No. 16/010,023, filed on Jun. 15, 2018, now Pat. No. 10,780,739.

(52) U.S. Cl.
CPC ........ *G07F 17/329* (2013.01); *G07F 17/3211* (2013.01); *G07F 17/3293* (2013.01); *G07F 17/34* (2013.01)

(56) References Cited

U.S. PATENT DOCUMENTS

| | | | |
|---|---|---|---|
| 3,040,391 A | 6/1962 | Saunders | |
| 3,432,878 A | 3/1969 | Hupfer | |
| 3,534,430 A | 10/1970 | Kesling | |
| 3,804,211 A | 4/1974 | Scherzinger | |
| 4,668,029 A | 5/1987 | Maizlish | |
| 4,783,879 A | 11/1988 | Weaver | |
| 5,044,864 A | 9/1991 | Stefan | |
| 5,232,232 A | 8/1993 | Kishi | |
| 5,375,294 A | 12/1994 | Garrett | |
| 5,558,027 A | 9/1996 | Williams | |
| 5,628,522 A | 5/1997 | Hall | |
| 5,769,436 A | 6/1998 | Andrey | |
| 5,778,488 A | 7/1998 | Tsai | |
| 5,971,408 A | 10/1999 | Mandel | |
| 5,975,829 A * | 11/1999 | Walters | A01B 73/005 14/71.1 |
| 6,464,586 B1 | 10/2002 | Kamata | |
| 6,588,061 B2 | 7/2003 | Becken | |
| 6,601,806 B2 | 8/2003 | Wing | |
| 7,922,589 B2 | 4/2011 | Kuhn | |
| 8,914,943 B2 | 12/2014 | Grassia | |
| 2002/0088819 A1 | 7/2002 | Wei | |
| 2002/0166202 A1 | 11/2002 | Maupin | |
| 2004/0060148 A1 * | 4/2004 | Ebeling | B60B 33/04 16/19 |
| 2005/0098969 A1 * | 5/2005 | Waldman | A47D 9/00 280/47.38 |
| 2005/0120518 A1 * | 6/2005 | Thompson | E05D 15/0669 16/320 |
| 2005/0217071 A1 | 10/2005 | Shinner | |
| 2010/0105474 A1 | 4/2010 | Shimizu | |
| 2014/0106855 A1 | 4/2014 | Lachance | |
| 2014/0265182 A1 | 9/2014 | Stanton | |
| 2016/0244204 A1 | 8/2016 | DeBattiste | B66F 3/24 |
| 2018/0086612 A1 * | 3/2018 | Ken | B66F 9/06 |
| 2018/0099180 A1 * | 4/2018 | Wilkinson | A63B 22/20 |
| 2019/0012874 A1 | 1/2019 | Goldstein | |
| 2019/0062049 A1 | 2/2019 | Russell | |
| 2020/0152098 A1 * | 5/2020 | Jokelainen | B60B 33/066 |

OTHER PUBLICATIONS

Office Action (Non-Final Rejection) dated Aug. 30, 2021 for U.S. Appl. No. 17/004,799 (pp. 1-5).

Office Action (Notice of Allowance and Fees Due (PTOL-85)) dated Dec. 14, 2021 for U.S. Appl. No. 17/004,799 (pp. 1-5).

* cited by examiner

RETRACTABLE WHEEL ASSEMBLY FOR RAISING AND LOWERING A GAMING MACHINE CABINET

CROSS-REFERENCE TO RELATED APPLICATIONS

This application is a continuation application of U.S. patent application Ser. No. 17/004,799, filed Aug. 27, 2020, which is a continuation application of U.S. patent application Ser. No. 16/010,023, filed Jun. 15, 2018, the entire contents and disclosures of which are hereby incorporated by reference in their entirety.

TECHNICAL FIELD

The field of disclosure relates generally to electronic gaming, and more particularly to an electronic gaming machine that can be raised and lowered on a set of retractable wheel assemblies for transport or movement within a casino.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards form any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many EGMs are very heavy and may be difficult to move or relocate within a casino. For example, modern EGMs may weigh greater than five-hundred pounds and may, in addition, be top heavy and/or otherwise quite tall and susceptible to tipping during transport. One common solution has been to install a fixed set of wheels or rollers on an underside of an EGM to facilitate transport and movement within a casino.

However, many of today's casinos locate their EMGs on carpeted or tile flooring, either of which may make the use of permanent and/or fixed wheels or rollers problematic. For example, the weight of an EGM may, over time, bury a set of fixed wheels deep into a carpeted floor, making extraction of the EGM at some later time quite difficult, if not unsafe. In addition, placement of an EGM having fixed wheels or rollers on a tile floor may lead to a variety of unsafe conditions, such as, for example, as a result of the fact that fixed-wheel EGMs are always capable of rolling and jostling on such smooth surfaces.

An electronic gaming machine that can be raised and lowered for transport or movement within a casino is therefore desirable. More particularly, an electronic gaming machine that can be raised and lowered on a set of retractable wheel assemblies for transport or movement on one or more flat surfaces within a casino is desirable.

BRIEF DESCRIPTION

In one aspect, an electronic gaming machine is provided. The electronic gaming machine includes a cabinet and a pair of retractable wheel assemblies mechanically coupled to the cabinet. Each retractable wheel assembly includes a first retractable wheel and a second retractable wheel. The first retractable wheel and the second retractable wheel of each retractable wheel assembly are movable, independently of one another, between a retracted position, in which the pair of retractable wheel assemblies allow the cabinet to contact an external surface, and an extended position, in which the pair of retractable wheel assemblies support the cabinet above the external surface.

In another aspect, a system of retractable wheel assemblies for raising and lowering an electronic gaming machine cabinet is provided. The system of retractable wheel assemblies includes a plurality of retractable wheel assemblies configured to be mechanically coupled to the gaming machine cabinet. Each of the plurality of retractable wheel assemblies includes a first retractable wheel and a second retractable wheel. The first retractable wheel and the second retractable wheel of each of the plurality of retractable wheel assemblies are movable, independently of one another, between a retracted position, in which the retractable wheel assemblies allow the cabinet to contact an external surface, and an extended position, in which the retractable wheel assemblies support the cabinet above the external surface.

In yet another aspect, a method of using a system of retractable wheel assemblies to raise an electronic gaming machine cabinet is provided. The method includes mechanically coupling a first retractable wheel assembly to the electronic gaming machine cabinet, and mechanically coupling a second retractable wheel assembly to the gaming machine cabinet. The first retractable wheel assembly includes a first retractable wheel and a second retractable wheel movable independently of the first retractable wheel, and the second the second retractable wheel assembly includes a third retractable wheel and a fourth retractable wheel movable independently of the third retractable wheel. The method further includes actuating the first retractable wheel, the second retractable wheel, the third retractable wheel, and the fourth retractable wheel, independently of one another, to move the electronic gaming machine cabinet from a lowered position into a raised position on the first retractable wheel assembly and the second retractable wheel assembly.

BRIEF DESCRIPTION OF THE DRAWINGS

An example embodiment of the subject matter disclosed will now be described with reference to the accompanying drawings.

DETAILED DESCRIPTION

A retractable wheel assembly is described. The retractable wheel assembly may include a first pusher plate coupled between a first wheel and an elongated structural member, and a second pusher plate coupled a second wheel and the elongated structural member. A first pusher member and a second pusher member may be extended and retracted through the elongated structural member, such as threadably rotated through the member, to engage and disengage a respective engagement surface of each pusher plate. When the pusher plates are engaged by a corresponding pusher member, the pusher plates may extend and retract about respective pivot locations or pivot axes, to push the first and second wheels into retracted and/or extended positions. In addition, a pair of such retractable wheel assemblies may be mounted on an underside of a gaming machine cabinet to raise and lower the cabinet as desired. In raised position, the cabinet may be movable or rollable on the wheels and capable of transport. In a lowered position, the cabinet may be stable and relatively stationary and secure on a support surface, such as a casino floor.

Figure 1:
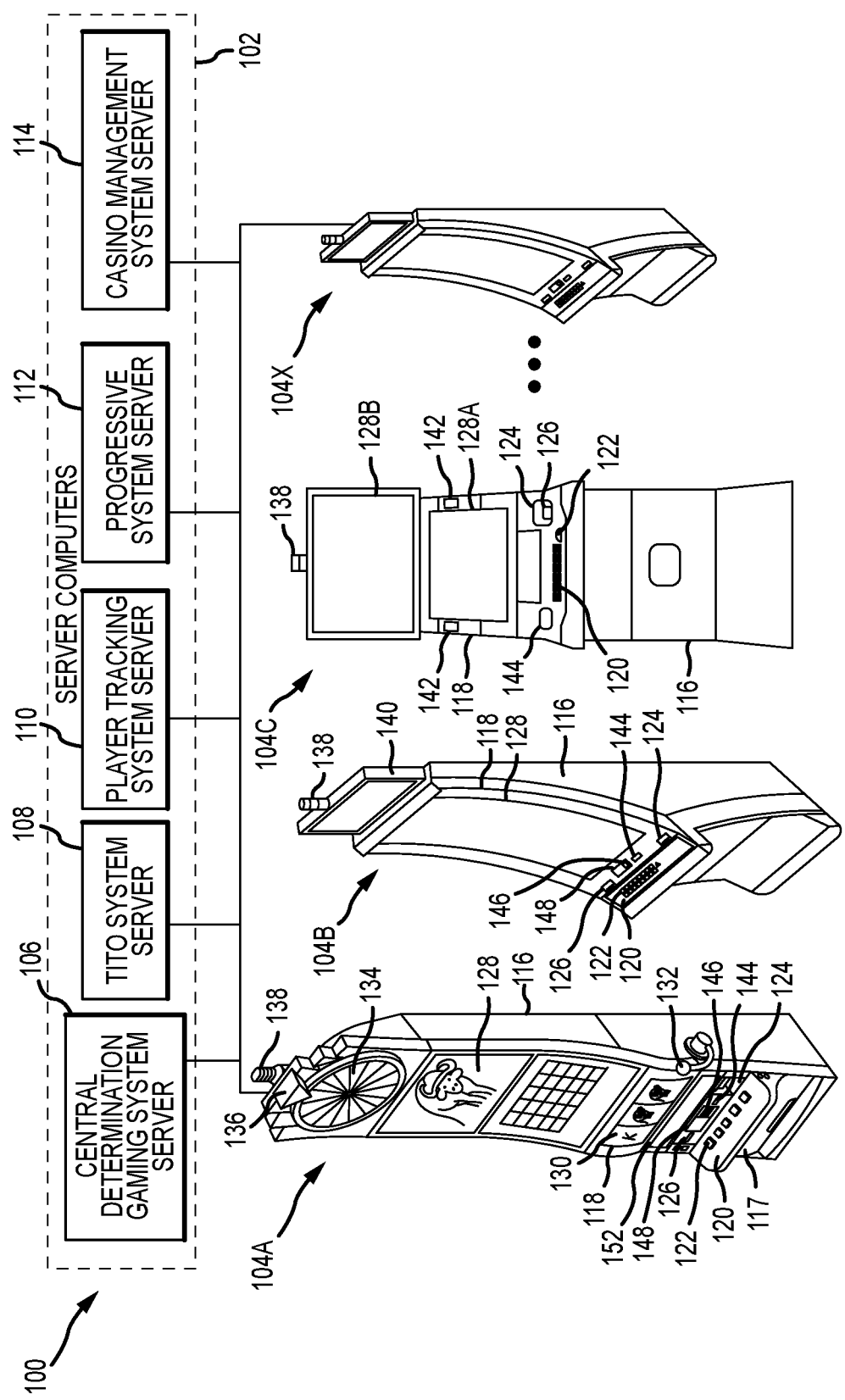
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 117 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
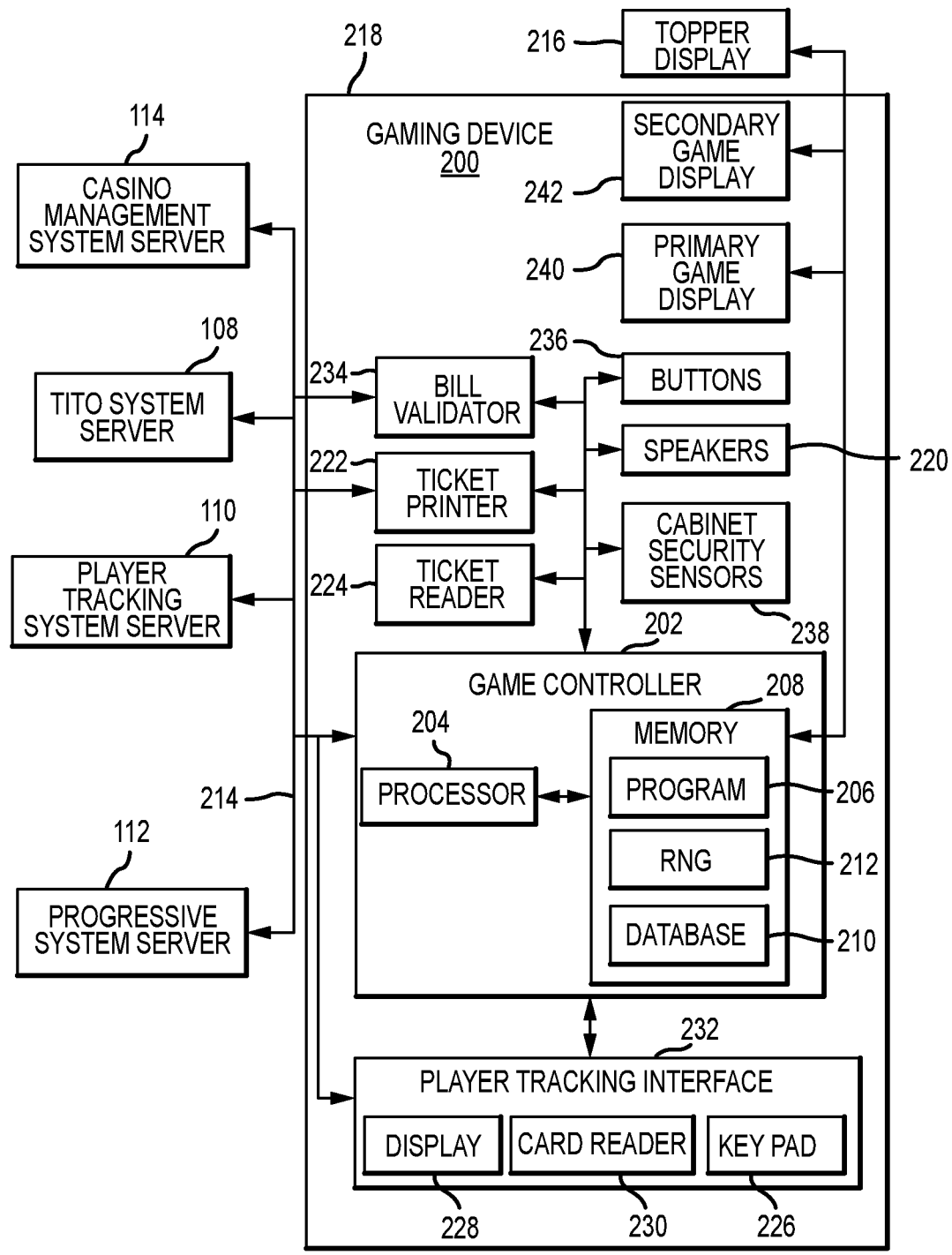
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 117 that opens to provide access to the interior of gaming device 104B. Main door 117, or service door, is typically used by service personnel to refill ticket-out printer 126 and collect bills and tickets inserted into bill validator 124. Main door 117 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A may include a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
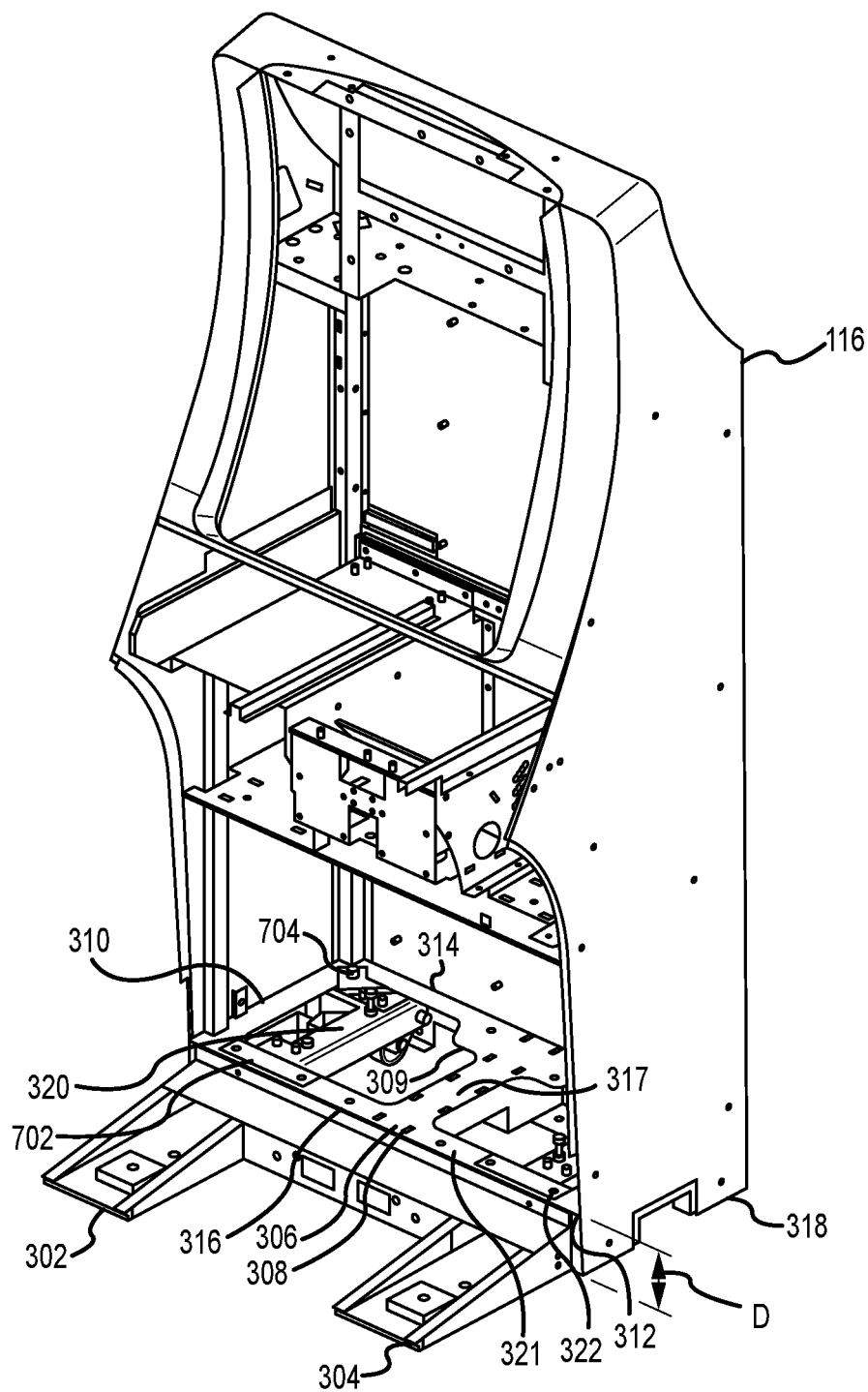
FIG. 3 is a front perspective view of an exemplary gaming machine cabinet, as shown in FIG. 1, that includes a plurality of retractable wheel assemblies for raising and lowering the gaming machine cabinet.
Figure 4:
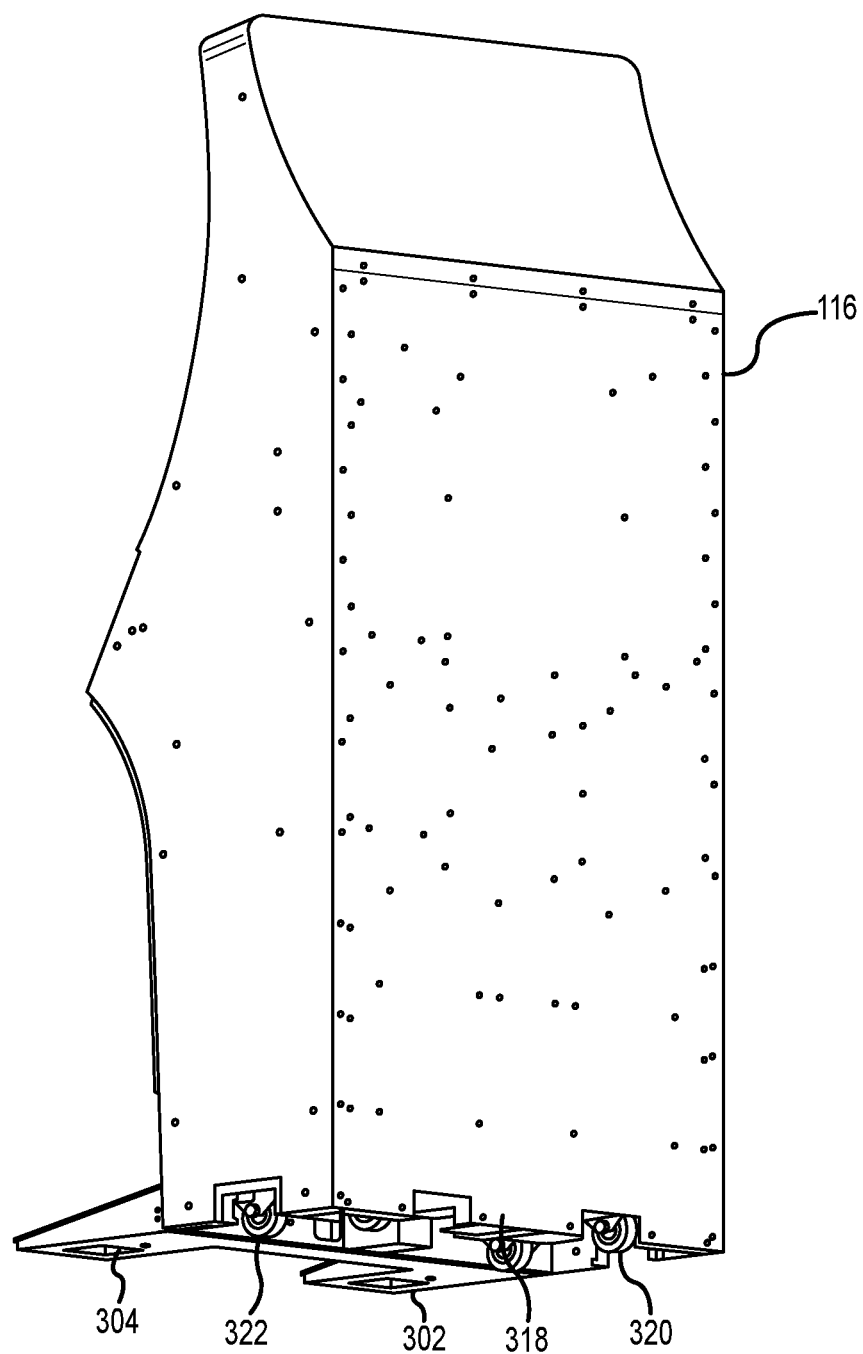
FIG. 4 is a rear perspective view of the gaming machine cabinet shown in FIG. 3.

FIG. 3 is a front perspective view of an exemplary gaming machine cabinet, such as main cabinet 116 (shown in FIG. 1). FIG. 4 is a rear perspective view of cabinet 116. In the exemplary embodiment, and with combined reference to FIG. 3 and FIG. 4, cabinet 116 includes a plurality of feet, such as a first foot 302 and a second foot 304 disposed opposite first foot 302 and extending substantially parallel to first foot 304. Feet 302 and 304 may be excluded from cabinet 116; however, where they are included, feet 302 and 304 may extend forward of cabinet 116, such as parallel to the z-axis, and may function to balance cabinet 116, particularly where cabinet 116 is somewhat tall, top-heavy, and/or otherwise susceptible to tipping.

Cabinet 116 may also include an internal frame 306. Internal frame 306 may comprise a generally rectangular support structure that includes an upper surface 308 and a lower surface 309 disposed opposite upper surface 308. Internal frame may, in addition, include a first edge 310, a second edge 312, a third edge 314, a fourth edge 316, and a cross-beam 317 disposed substantially centrally of first edge 310 and second edge 312 and joining third edge 314 and fourth edge 316. In various embodiments, internal frame 306 may include any suitable shape and/or structure, such as any other polygonal shape and/or any other solid planar and/or non-solid or lattice-shaped structure.

In various embodiments, cabinet 116 may also include a base or base-stand, such as, for example, a base-stand 318, which may extend parallel to the y-axis a distance, D, from lower surface 309 of internal frame 306. For example, base-stand 318 may include a perimeter 321 that supports cabinet 116 and extends the distance, D, between internal frame 306 and a support surface, such as a casino floor. In some embodiments, base-stand 318 may also include a plurality of leveling feet (not shown), which may be used to make small adjustments to the orientation of cabinet 116 on a support surface (e.g., to level cabinet 116 if, for example, the support surface is uneven).

Thus, base-stand 318 may raise internal frame 306 off a casino floor by the distance, D. As described in greater detail below, this configuration may facilitate the attachment of a plurality of retractable wheel assemblies to internal frame 306, each of which may extend, in an extended or raised position, from internal frame 306 towards the support surface by at least the distance, D, to retractably raise cabinet 116 off the support surface. In some embodiments, one or more retractable wheel assemblies may be permanently coupled to internal frame 306, rather than removably coupled thereto. Both of these options are contemplated by and within the scope of the present disclosure.

Accordingly, to facilitate transport, a plurality of retractable wheel assemblies may be mechanically coupled to cabinet 116. Specifically, a first retractable wheel assembly 320 and a second, identical, retractable wheel assembly 322 may be mechanically coupled to cabinet 116. As described herein, each retractable wheel assembly 320 and 322 may be configured to move between a retracted position, in which cabinet 116 is allowed to rest on a support surface, and an extended position in which cabinet 116 is raised, such as by the distance, D (or slightly greater than the distance, D), away from the support surface.

More particularly, first retractable wheel assembly 320 and second retractable wheel assembly 322 may be mechanically coupled to internal frame 306 of cabinet 116. For example, first retractable wheel assembly 320 may be mechanically coupled, at least in part, between third edge 314 and fourth edge 316 and parallel to first edge 310 of internal frame 306, and second retractable wheel assembly 322 may be mechanically coupled, at least in part, between third edge 314 and fourth edge 316 and parallel to second edge 312.

In some embodiments, first retractable wheel assembly 320 and second retractable wheel assembly 322 may be attached to internal frame 306, such that each retractable wheel assembly 320 and 322 is aligned with and runs substantially parallel to a respective edge 310 and 312 of internal frame 306. In this way, first retractable wheel assembly 320 and second retractable wheel assembly 322 may be arranged under internal frame 306 of cabinet 116 in a configuration suitable for transport or movement of cabinet 116 on each retractable wheel assembly 320 and 322. Additional details related to the mechanical coupling between each retractable wheel assembly 320 and 322 and internal frame 306 are provided below with reference to FIG. 7.

Figure 5:
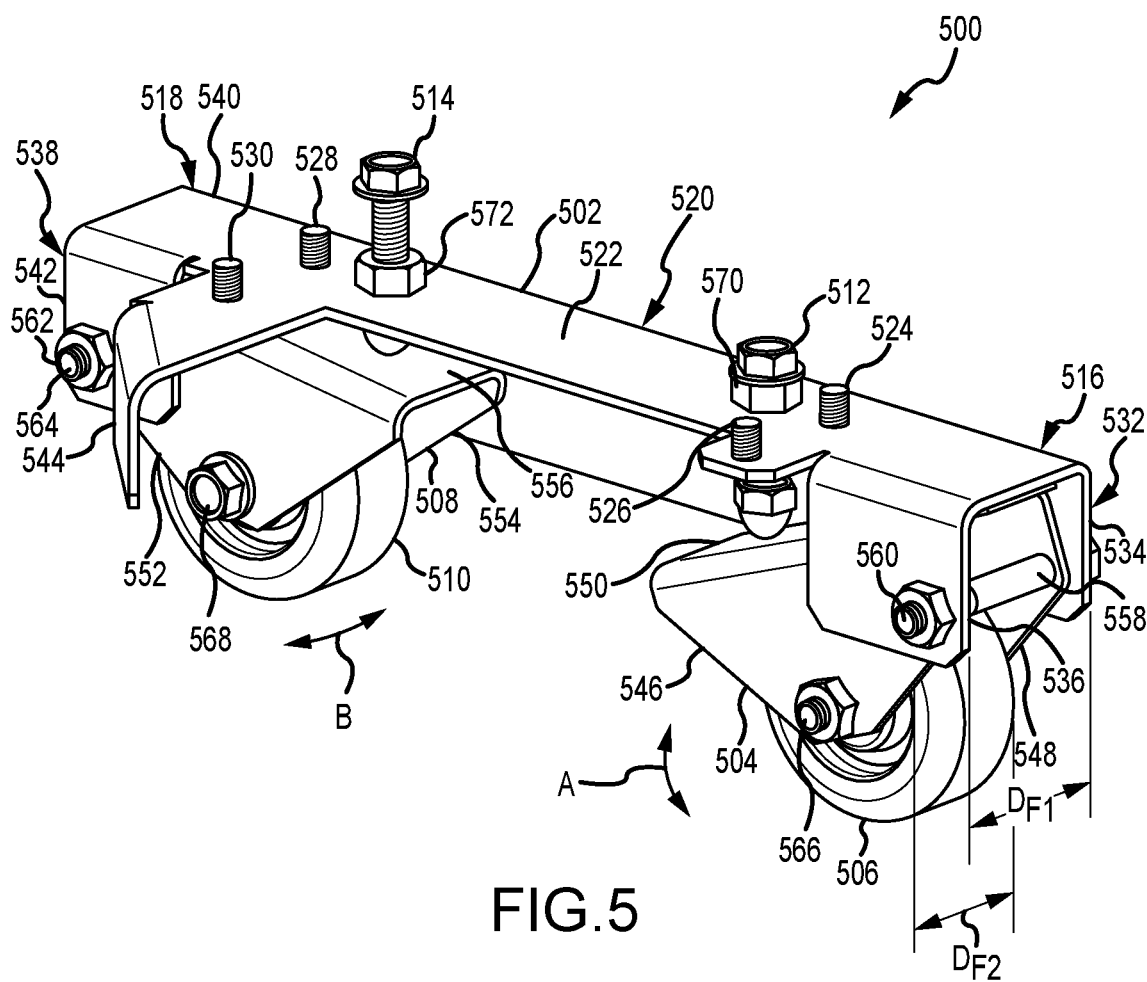
FIG. 5 is a perspective view of an exemplary retractable wheel assembly, as shown in FIG. 3 and FIG. 4.
Figure 6:
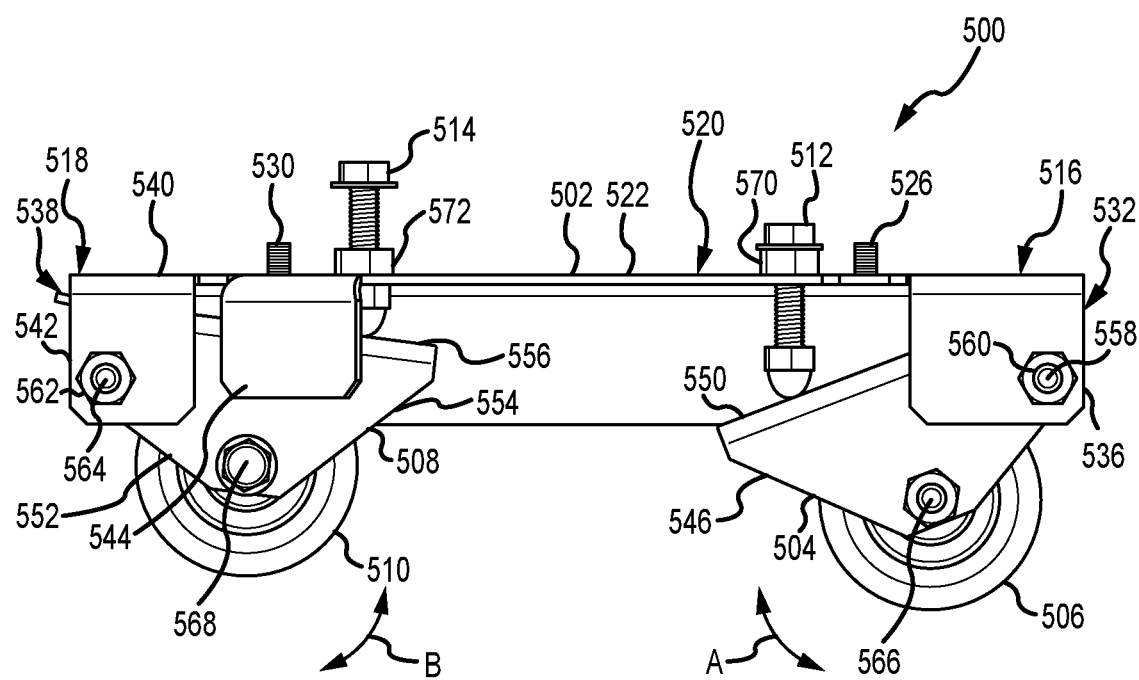
FIG. 6 is a side view of the retractable wheel assembly shown in FIG. 5.

FIG. 5 is a perspective view of an exemplary retractable wheel assembly 500, such as either or both of first retractable wheel assembly 320 and/or second retractable wheel assembly 322. FIG. 6 is a side view of retractable wheel assembly 500. As shown with combined reference to FIG. 5 and FIG. 6, retractable wheel assembly 500 may generally include an elongated structural member 502, a first pusher plate 504, a first wheel 506, a second plusher plate 508, and a second wheel 510. Retractable wheel assembly 500 may also include a first pusher member 512, such as a first bolt, and/or a second pusher member 514, such as a second bolt.

In the exemplary embodiment, elongated structural member 502 may be generally L-shaped in cross-section and includes a first end 516, a second end 518, and a body 520 extending therebetween. As shown, body 520 includes a receiving surface 522. A plurality of mounting pins, such as a first mounting pin 524, a second mounting pin 526, a third mounting pin 528, and a fourth mounting pin 530, may extend orthogonally away from receiving surface 522. As described below (e.g., with reference to FIG. 7), mounting pins 524-530 may be used to mechanically couple or attach retractable wheel assembly 500 to internal frame 306 of cabinet 116.

In various embodiments, elongated structural member 502 may be approximately as long as an edge or side of cabinet 116. For example, elongated structural member 502 may be approximately equal in length to first edge 310 and/or second edge 312 of internal frame 306, such that elongated structural member 502 is capable of fully supporting either edge 310 and/or 312 on receiving surface 522 when coupled or mounted under the edge 310 and/or 312. In other embodiments, elongated structural member may be longer or shorter than an edge 310 and/or 312 of internal frame 306.

At first end 516, elongated structural member 502 may include a first U-shaped portion 532 having a first flange 534 and a second, opposing, flange 536. First flange 534 and second flange 536 may be separated by a first flange distance, $D_{F1}$. Similarly, at second end 518, elongated structural member 502 may include a second U-shaped portion 538 having a first flange 540 and a second, opposing, flange 542. First flange 540 and second flange 542 may also be separated by the first flange distance, $D_{F1}$. In some embodiments, elongated structural member 502 may also include a flared or angled portion 544, which may extend at an angle, such as at an angle of approximately forty-five degrees, from body 520 towards second end 518.

In the exemplary embodiment, first U-shaped portion 532 and second U-shaped portion 538 are inverted or turned down, away from receiving surface 522. More particularly, first U-shaped portion 532 and second U-shaped portion 538 are turned down, such that the flanges 534, 536, 540, and 542 of each U-shaped portion 532 and 538 extend generally downwards towards a support surface, such as a casino floor.

First pusher plate 504 may comprise a unitary or integral structure and may include a first flange 546, a second flange 548, and an engagement surface 550 extending therebetween. First flange 546 and second flange 548 may be separated by a second flange distance, $D_{F2}$. Similarly, second pusher plate 508 may comprise a unitary or integral structure and may include a first flange 552, a second flange 554, and an engagement surface 556 extending therebetween. First flange 552 and second flange 554 may also be separated by the second flange distance, $D_{F2}$. In some embodiments, first pusher plate 504 and second pusher plate 508 are forks for mounting a wheel, such as first wheel 506 and/or second wheel 510, respectively. Specifically, in some embodiments, first pusher plate 504 and second pusher plate 508 are caster forks (e.g., any of a number of commercially available caster forks).

In the exemplary embodiment, first pusher plate 504 may be slotted or inserted within first U-shaped portion 532. Specifically, the first flange distance, $D_{F1}$, separating the flanges 534 and 536 of first U-shaped portion 532 may be slightly greater than the second flange distance, $D_{F2}$, separating the flanges 546 and 548 of first pusher plate 504. In particular, $D_{F2}$ may be sufficiently less than $D_{F1}$ to facilitate insertion of first pusher plate 504 within first U-shaped portion 532 without unnecessary play or wiggle between components.

Likewise, second pusher plate 508 may be slotted or inserted within second U-shaped portion 538, as above, such that the first flange distance, $D_{F1}$, separating the flanges 540 and 542 of second U-shaped portion 538 is slightly greater than the second flange distance, $D_{F2}$, separating the flanges 552 and 554 of second pusher plate 508. In particular, $D_{F2}$ may be sufficiently less than $D_{F1}$ to facilitate insertion of second pusher plate 508 within second U-shaped portion 538 without unnecessary play or wiggle between components.

To couple first pusher plate 504 to first U-shaped portion 532, a first shaft 558 may pivotably couple first pusher plate 504 to first U-shaped portion 532 at a first pivot axis or pivot location 560. Specifically, first shaft 558 may extend through a plurality of apertures or holes formed in first pusher plate 504 and first U-shaped portion 532, all of which may be aligned to receive first shaft 558. In various embodiments, first shaft 558 may be threaded and secured on first U-shaped portion 532 by a nut and/or another threaded fastener.

To couple second pusher plate 508 to second U-shaped portion 538, a second shaft 562 may pivotably couple second pusher plate 508 to second U-shaped portion 538 at a second pivot axis or pivot location 564. Specifically, second shaft 562 may extend through a plurality of apertures or holes formed in second pusher plate 508 and second U-shaped portion 538, all of which may be aligned to receive second shaft 562. In various embodiments, second shaft 562 may be threaded and secured on second U-shaped portion 538 by a nut and/or another threaded fastener.

As described above, first pusher plate 504 may be, in the exemplary embodiment, forked to receive first wheel 506. Accordingly, to mount or couple first wheel 506 within first pusher plate 504, a first axle 566 may be inserted through apertures in first pusher plate 504 and first wheel 506, all of which may be aligned to receive first axle 566. First axle 566 may be threaded and secured on first pusher plate 504 by a nut and/or another threaded fastener.

Similarly, second pusher plate 508 may be forked to receive second wheel 510. In addition, to mount or couple second wheel 510 within second pusher plate 508, as described above, a second axle 568 may be inserted through apertures in second pusher plate 508 and second wheel 510, all of which may be aligned to receive second axle 568. Second axle 568 may be threaded and secured on second pusher plate 508 by a nut and/or another threaded fastener.

Further, as described above, retractable wheel assembly 500 may, in various embodiments, include a first pusher member 512, such as a first bolt, and/or a second pusher member 514, such as a second bolt. First pusher member 512 may be configured to be inserted through, and threadably engage with, a first threaded aperture or hole (not shown) in elongated structural member 502, which may in some embodiments, include a first reinforcing or securing nut 570. Likewise, second pusher member 514 may be configured to be inserted through, and threadably engage with, a second threaded aperture or hole (not shown) in elongated structural member 502, which may, in some embodiments, include a second reinforcing or securing nut 572.

Figure 7:
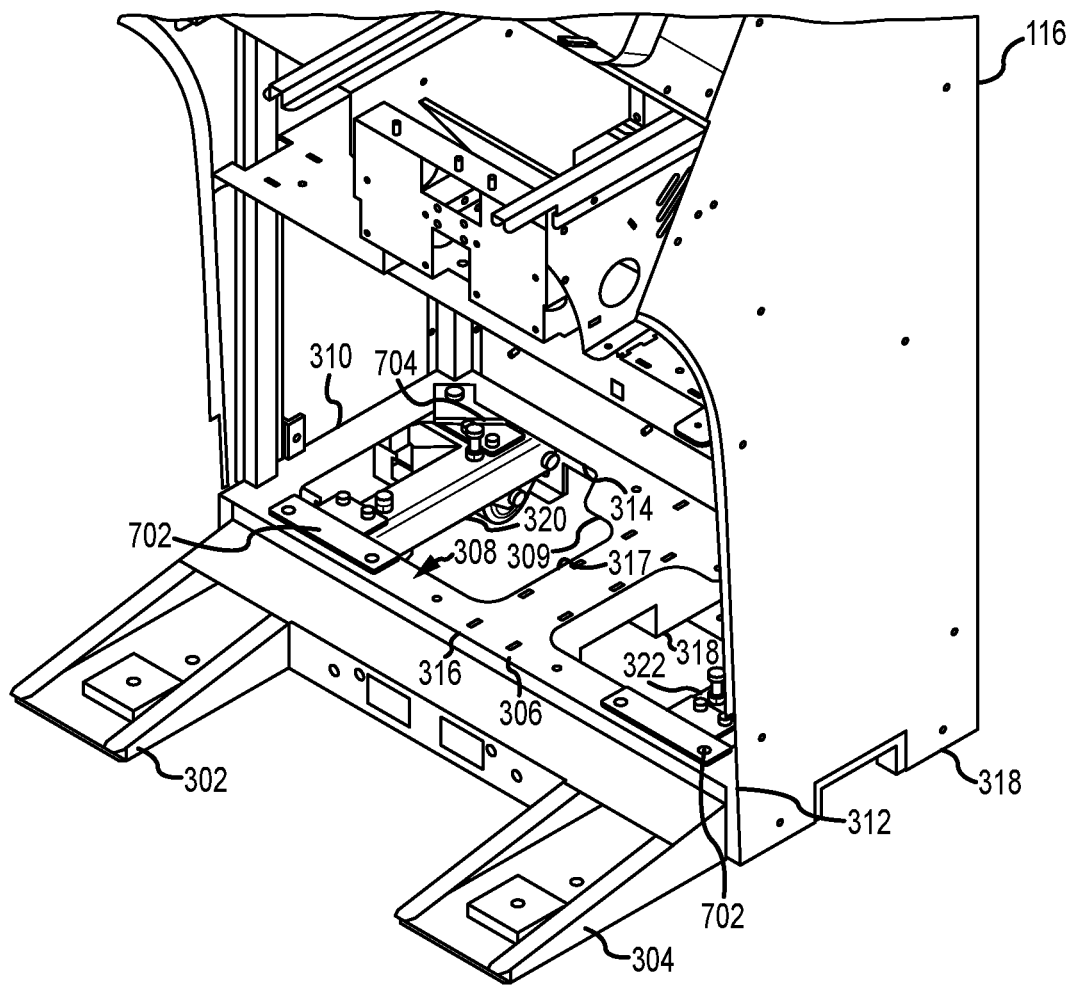
FIG. 7 is an enlarged view of a portion of the gaming machine cabinet shown in FIG. 3, in which the plurality of retractable wheel assemblies are attached to an internal frame of the gaming machine cabinet.

FIG. 7 is an enlarged view of a portion of gaming machine cabinet 116 (shown in FIG. 3), and illustrates, in additional detail, the attachments between first retractable wheel assembly 320, second retractable wheel assembly 322, and cabinet 116. Specifically, the attachment between first retractable wheel assembly 320 and cabinet 116 is shown, and the attachment between second retractable wheel assembly 322 and cabinet 116 is partially shown (owing to the perspective orientation of the Figure). Although the attachment between second retractable wheel assembly 322 and cabinet 116 is only partially shown, it will be appreciated that the attachment between second retractable wheel assembly 322 and cabinet 116 is identical to the attachment between first retractable wheel assembly 320 and cabinet 116, except as to the mounting location on internal frame 306.

Accordingly, in the exemplary embodiment, first retractable wheel assembly 320 extends between third edge 314 and fourth edge 316 of internal frame 306 and runs substantially parallel to first edge 310. In at least one embodiment, lower surface 309 of internal frame 306 rests on and is supported by receiving surface 522 of elongated structural member 502. In addition, first retractable wheel assembly 320 may be mechanically coupled to (e.g., clamped or fastened on) internal frame 306 by one or more fasteners or mounting plates.

For example, in at least one embodiment, a first mounting plate 702 may be mechanically coupled or fastened on both of upper surface 308 of internal frame 306 at third edge 314 and receiving surface 522 of elongated structural member 502, such that first mounting plate 702 joins and secures internal frame 306 and elongated structural member 502 at third edge 314. Specifically, first mounting plate 702 may be clamped or bolted on first elongated structural member 502 at first mounting pin 524 and second mounting pin 526, each of which may extend through corresponding holes or apertures in first mounting plate 702. Each mounting pin 524 and 526 may secure first mounting plate 702 using one or more fasteners, such as one or more nuts. Likewise, first mounting plate 702 may be clamped, riveted, bolted, or otherwise secured on upper surface 308 of third edge 314 of internal frame 306. Thus, first mounting plate 702 may mechanically couple and secure first retractable wheel assembly 320 to internal frame 306 at third edge 314 of internal frame 306.

In addition to first mounting plate 702, elongated structural member 502 of first retractable wheel assembly 320 may also be mechanically coupled to internal frame 306 at fourth edge 316 of internal frame 306 by a second mounting plate 704. Second mounting plate 704 may be mechanically coupled or fastened on both of upper surface 308 of internal frame 306 at fourth edge 316 and receiving surface 522 of elongated structural member 502, such that second mounting plate 704 joins and secures internal frame 306 and elongated structural member 502 at fourth edge 316. Specifically, second mounting plate 704 may be clamped and/or bolted on first elongated structural member 502 at third mounting pin 528 and fourth mounting pin 530, each of which may extend through corresponding holes or apertures in second mounting plate 704. In addition, as shown, internal frame 306 may rest, at least partially, on flared or angled portion 544 of elongated structural member 502 for additional structural support.

As above, each mounting pin 528 and 530 may secure second mounting plate 704 using one or more fasteners, such as one or more nuts. Likewise, second mounting plate 704 may be clamped, riveted, bolted, or otherwise secured on upper surface 308 of fourth edge 316 of internal frame 306. Thus, second mounting plate 704 may mechanically couple and secure first retractable wheel assembly 320 to internal frame 306 at fourth edge 316 of internal frame 306.

In addition, as described above, second retractable wheel assembly 322 extends between third edge 314 and fourth edge 316 of internal fame and runs substantially parallel to second edge 312 as well. Second retractable wheel assembly 322 may also be mechanically coupled to and secured on internal frame 306 in the same manner as first retractable wheel assembly 320, as described above. Accordingly, specific details of the mechanical coupling between second retractable wheel assembly 322 and internal frame 306 are not provided herein. Rather, it will be understood that the mechanical coupling between second retractable wheel assembly 322 and internal frame 306 is accomplished in the same way that the mechanical coupling between first retractable wheel assembly 320 is accomplished, as described above.

In operation, first retractable wheel assembly 320 and second retractable wheel assembly 322 may be mounted under and mechanically coupled to internal frame 306, as described in detail above. For example, in some embodiments, first retractable wheel assembly 320 and second retractable wheel assembly 322 are not permanently coupled to internal frame 306 but may be removably attached, such as prior to deployment of cabinet 116 within a casino. In other embodiments, however, first retractable wheel assembly 320 and second retractable wheel assembly 322 are permanently coupled to internal frame 306. In such a case, first retractable wheel assembly 320 and second retractable wheel assembly 322 may be attached to internal frame 306 during manufacture or assembly of cabinet 116.

In either embodiment, cabinet 116 may rest upon and be supported by first retractable wheel assembly 320 and second retractable wheel assembly 322. In addition, and as described herein, first retractable wheel assembly 320 and second retractable wheel assembly 322 may be retracted in a first or retracted position, such that cabinet 116 is lowered. Likewise, first retractable wheel assembly 320 and second retractable wheel assembly 322 may be extended or raised in a second or extended position, such that cabinet 116 is raised.

When first retractable wheel assembly 320 and second retractable wheel assembly 322 are in the first or retracted position, cabinet 116 may rest on base-stand 318, and first retractable wheel assembly 320 and second retractable wheel assembly 322 may be retracted or stowed. For example, the wheels (e.g., wheels 506 and 510) of first retractable wheel assembly 320 and second retractable wheel assembly 322 may be retracted, such that each wheel 506 and 510 extends less than the distance, D, away from lower surface 309 of internal frame 306. As a result, cabinet 116 may rest on base-stand 318 in a lowered position.

On the other hand, when first retractable wheel assembly 320 and second retractable wheel assembly 322 are in the second or extended position, cabinet 116 may be raised off of base-stand 318, such that cabinet 116 rests on the wheels (e.g., wheels 506 and 510) of each retractable wheel assembly 320 and 322. More particularly, in at least some embodiments, the wheels 506 and 510 of each retractable wheel assembly 320 and 322 may be extended, as described below, such that each wheel 506 and 510 extends at least the distance, D, away from lower surface 309 of internal frame 306. In some embodiments, each wheel 506 and 510 of each retractable wheel assembly 320 and 322 may extend approximately 0.1-6.0 inches beyond the distance, D. As a result, and in an extended position, the wheels 506 and 510 may raise cabinet 116 off of base-stand 318, such that cabinet 116 rests on and is rollably supported on wheels 506 and 510 of each retractable wheel assembly 320 and 322.

To move a retractable wheel assembly 500 (e.g., either of first retractable wheel assembly 320 and second retractable wheel assembly 322) between a retracted and extended position, first pusher member 512 and second pusher member 514 may be extended through elongated structural member 502, as described above. For example, in the case that first pusher member 512 and second pusher member 514 are threaded bolts, each pusher member 512 and 514 may be rotated through a threaded portion of elongated structural member 502, such as through first securing nut 570 and second securing nut 572, respectively. As each pusher member 512 and 514 rotates through a respective securing nut 570 and 572, the pusher member 512 and 514 may slowly extend towards a corresponding engagement surface 550 and/or 556 of a respective pusher plate 504 and/or 508.

As pusher members 512 and/or 514 extend into contact with each corresponding engagement surface 550 and 556, pusher plates 504 and 508 may be driven by the action of each pusher member 512 and 514 into an extended position. More particularly, first pusher plate 504 may pivot about first pivot location 560, as described above, such that a range of motion of first pusher plate 504 is generally in the direction of the arrow marked A. Likewise, second plusher plate 508 may pivot about second pivot location 564, as described above, such that a range of motion of second pusher plate 508 is generally in the direction of the arrow marked B. As each pusher plate is engaged and driven by a respective pusher member 512 and 514, respectively, each corresponding wheel 506 and 510 is, in turn, moved into an extended position.

For illustrative purposes, and with reference to FIG. 5 and FIG. 6, first wheel 506 is shown in an extended position (e.g., in which first pusher member 512 is fully extended and engaged with first pusher plate 504). Likewise, second wheel 510 is shown in a retracted position (e.g., in which second pusher member 514 is fully retracted and disengaged from or only topically engaged with second pusher plate 508).

Although in FIG. 5 and FIG. 6, first pusher member 512 is shown in an extended position and second pusher member 514 is shown in a retracted position, it will be appreciated, as described herein, that both pusher members 512 and 514 may be retracted and extended together (or substantially together) to coordinate the retraction and extension of wheels 506 and 510. In other words, in practice, a user or casino technician may, substantially at the same time, in small increments, and/or sequentially, extend and/or retract each pusher member 512 and 514 to coordinate the extension and/or retraction of wheels 506 and 510.

Figure 8:
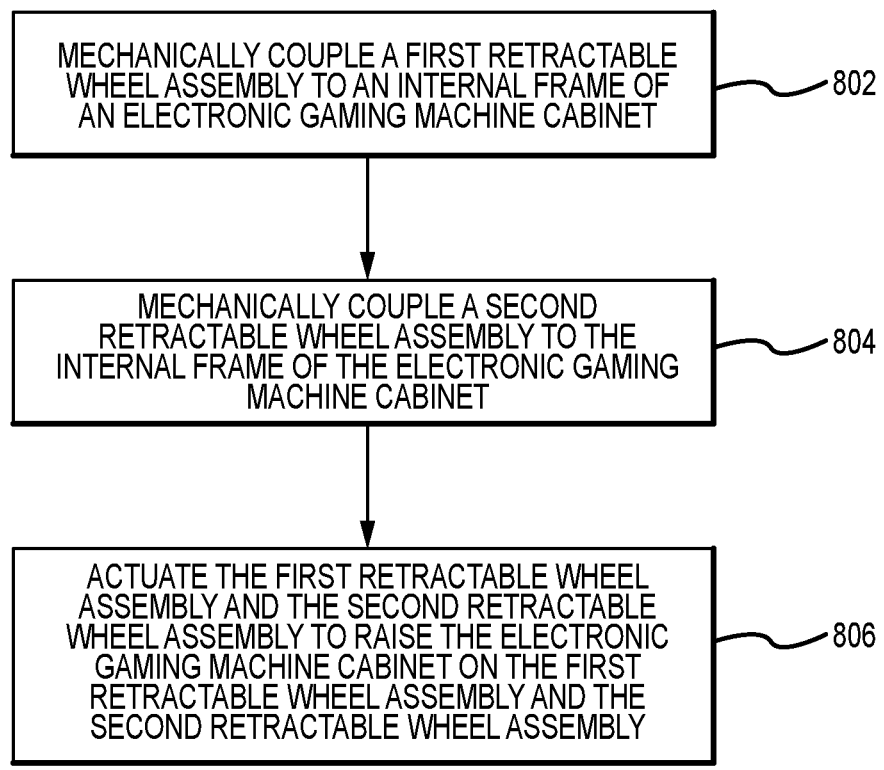
FIG. 8 depicts a flowchart illustrating a process for raising the gaming machine cabinet shown in FIG. 3 on first and second retractable wheel assemblies.

FIG. 8 generally illustrates a high-level process for raising cabinet 116 on first and second retractable wheel assemblies 320 and 322. Accordingly, in the exemplary embodiment, first retractable wheel assembly 320 may be mechanically coupled to internal frame 306 of cabinet 116 (step 802). Likewise, second retractable wheel assembly 322 may be mechanically coupled to internal frame 306 of cabinet 116 (step 804). Moreover, first retractable wheel assembly 320 and second retractable wheel assembly 322 may be actuated, such as by a casino technician using an impact wrench to drive or extend first and second pusher members 512 and 514, to raise cabinet 116 on the first retractable wheel assembly 320 and second retractable wheel assembly 322 (step 806). In various embodiments, each wheel 506 and 510 of each retractable wheel assembly 320 and 322 may be actuated independently and/or a technician may incrementally and iteratively raise each wheel 506 and 510 to maintain cabinet 116 is an essentially level position during raising and lowering.

In some embodiments, a casino technician may not be required to manually actuate first retractable wheel assembly 320 and/or second retractable wheel assembly 322. Rather, in at least some embodiments, extension and/or retraction of first retractable wheel assembly 320 and/or second retractable wheel assembly 322 may be automated, such as, for example, by a pushbutton (not shown) that is actuable by a casino technician. In response to actuation of the pushbutton, a control signal may be provided to one or more systems or devices for automatically extending and retracting wheel assemblies 320 and/or 322. For example, when the pushbutton is actuated, a control signal may be provided to one or more motors (not shown) configured to rotate (and extend and/or retract) one or more pusher members, such as pusher members 512 and 514.

Thus, a retractable wheel assembly is described. The retractable wheel assembly may include a first pusher plate coupled between a first wheel and an elongated structural member, and a second pusher plate coupled a second wheel and the elongated structural member. A first pusher member and a second pusher member may be extended and retracted through the elongated structural member, such as threadably rotated through the member, to engage and disengage a respective engagement surface of each pusher plate. When the pusher plates are engaged by a corresponding pusher member, the pusher plates may extend and retract about respective pivot locations or pivot axes, to push the first and second wheels into retracted and/or extended positions. In addition, a pair of such retractable wheel assemblies may be mounted on a gaming machine cabinet to raise and lower the cabinet as desired. In raised position, the cabinet may be movable or rollable on the wheels and capable of transport. In a lowered position, the cabinet may be stable and relatively stationary and secure on a support surface, such as a casino floor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
   a cabinet;
   a pair of retractable wheel assemblies mechanically coupled to the cabinet, wherein each retractable wheel assembly comprises:
      a first retractable wheel; and
      a second retractable wheel;
   wherein the first retractable wheel and the second retractable wheel of each of the pair of retractable wheel assemblies are movable, independently of one another, between a retracted position, in which the pair of retractable wheel assemblies allow the cabinet to contact an external surface, and an extended position, in which the pair of retractable wheel assemblies support the cabinet above the external surface.

2. The electronic gaming machine of claim 1, wherein the first retractable wheel and the second retractable wheel of each of the pair of retractable wheel assemblies are in-line.

3. The electronic gaming machine of claim 1, wherein the cabinet comprises a door that provides access to an interior compartment of the cabinet, and wherein the pair of retractable wheel assemblies are mechanically coupled to the cabinet such that the pair of retractable wheel assemblies is accessible from the interior compartment.

4. The electronic gaming machine of claim 1, wherein each of the pair of retractable wheel assemblies further comprises:
   a first mounting bracket configured to be mechanically coupled between the retractable wheel assembly and an internal frame of the cabinet; and
   a second mounting bracket configured to be mechanically coupled between the retractable wheel assembly and the internal frame of the cabinet.

5. The electronic gaming machine of claim 1, wherein each of the pair of retractable wheel assemblies further comprises:
   an elongated structural member defining first and second U-shaped portions;
   a first pusher plate pivotably coupled to the first U-shaped portion; and
   a second pusher plate pivotably coupled to the second U-shaped portion;
   wherein the first retractable wheel is mechanically coupled to the first pusher plate, and the second retractable wheel is mechanically coupled to the second pusher plate.

6. The electronic gaming machine of claim 5, wherein the elongated structural member comprises a first end, a second end, and a body extending therebetween, and wherein the first U-shaped portion is disposed at the first end of the elongated structural member, and wherein the second U-shaped portion is disposed at the second end of the elongated structural member.

7. The electronic gaming machine of claim 5, wherein each of the pair of retractable wheel assemblies further comprises:
   a first bolt threadably engaged with the elongated structural member, the first bolt extending through the elongated structural member to contact an engagement surface of the first pusher plate, the first bolt configured to engage with the engagement surface of the first pusher plate to allow the first retractable wheel to move between the extended position and the retracted position; and
   a second bolt threadably engaged with the elongated structural member, the second bolt extending through the elongated structural member to contact an engagement surface of the second pusher plate, the second bolt configured to engage with the engagement surface of the second pusher plate to allow the second retractable wheel to move between the extended position and the retracted position.

8. The electronic gaming machine of claim 7, wherein the cabinet is raised and lowered by engagement of the first bolt with the engagement surface of the first pusher plate and by engagement of the second bolt with the engagement surface of the second pusher plate.

9. The electronic gaming machine of claim 5, wherein each of the pair of retractable wheel assemblies further comprises at least one mounting bracket configured to be mechanically coupled between the elongated structural member of the retractable wheel assembly and an internal frame of the cabinet, such that the retractable wheel assembly is secured on the internal frame of the cabinet.

10. The electronic gaming machine of claim 5, wherein the elongated structural member includes an upper receiving surface, and wherein the first and second U-shaped portions depend from the upper receiving surface, wherein each of the pair of retractable wheel assemblies further comprises a plurality of mounting fasteners extending upward from the upper receiving surface.

11. A system of retractable wheel assemblies for raising and lowering an electronic gaming machine cabinet, the system of retractable wheel assemblies comprising:
   a plurality of retractable wheel assemblies configured to be mechanically coupled to the gaming machine cabinet, wherein each of the plurality of retractable wheel assemblies comprises:
      a first retractable wheel; and
      a second retractable wheel;
   wherein the first retractable wheel and the second retractable wheel of each of the plurality of retractable wheel assemblies are movable, independently of one another, between a retracted position, in which the retractable wheel assemblies allow the cabinet to contact an external surface, and an extended position, in which the retractable wheel assemblies support the cabinet above the external surface.

12. The system of retractable wheel assemblies of claim 11, wherein the first retractable wheel and the second retractable wheel of each of the plurality of retractable wheel assemblies are in-line.

13. The system of retractable wheel assemblies of claim 11, wherein each of the plurality of retractable wheel assemblies further comprises:
a first mounting bracket configured to be mechanically coupled between a corresponding retractable wheel assembly and an internal frame of the gaming machine cabinet; and
a second mounting bracket configured to be mechanically coupled between the corresponding retractable wheel assembly and the internal frame of the gaming machine cabinet.

14. The system of retractable wheel assemblies of claim 11, wherein each of the plurality of retractable wheel assemblies further comprises:
an elongated structural member defining first and second U-shaped portions;
a first pusher plate pivotably coupled to the first U-shaped portion; and
a second pusher plate pivotably coupled to the second U-shaped portion;
wherein the first retractable wheel is mechanically coupled to the first pusher plate, and the second retractable wheel is mechanically coupled to the second pusher plate.

15. The system of retractable wheel assemblies of claim 14, wherein the first pusher plate comprises a first caster fork for supporting the first retractable wheel, and wherein the second pusher plate comprises a second caster fork for supporting the second retractable wheel.

16. The system of retractable wheel assemblies of claim 15, wherein the first caster fork is at least partially disposed within the first U-shaped portion, and wherein the second caster fork is at least partially disposed within the second U-shaped portion.

17. The system of retractable wheel assemblies of claim 14, wherein the elongated structural member comprises a first end, a second end, and a body extending therebetween, and wherein the first U-shaped portion is disposed at the first end of the elongated structural member, and wherein the second U-shaped portion is disposed at the second end of the elongated structural member.

18. The system of retractable wheel assemblies of claim 14, wherein each of the plurality of retractable wheel assemblies further comprises:
a first bolt threadably engaged with the elongated structural member, the first bolt extending through the elongated structural member to contact an engagement surface of the first pusher plate, the first bolt configured to engage with the engagement surface of the first pusher plate to allow the first retractable wheel to move between the extended position and the retracted position; and
a second bolt threadably engaged with the elongated structural member, the second bolt extending through the elongated structural member to contact an engagement surface of the second pusher plate, the second bolt configured to engage with the engagement surface of the second pusher plate to allow the second retractable wheel to move between the extended position and the retracted position.

19. The system of retractable wheel assemblies of claim 14, wherein the elongated structural member includes an upper receiving surface, and wherein the first and second U-shaped portions depend from the upper receiving surface, wherein each of the plurality of retractable wheel assemblies further comprises a plurality of mounting fasteners extending upward from the upper receiving surface.

20. A method of using a system of retractable wheel assemblies to raise an electronic gaming machine cabinet, the method comprising:
mechanically coupling a first retractable wheel assembly to the electronic gaming machine cabinet, the first retractable wheel assembly including a first retractable wheel and a second retractable wheel movable independently of the first retractable wheel;
mechanically coupling a second retractable wheel assembly to the gaming machine cabinet, the second retractable wheel assembly including a third retractable wheel and a fourth retractable wheel movable independently of the third retractable wheel; and
actuating the first retractable wheel, the second retractable wheel, the third retractable wheel, and the fourth retractable wheel, independently of one another, to move the electronic gaming machine cabinet from a lowered position into a raised position on the first retractable wheel assembly and the second retractable wheel assembly.

* * * * *